United States Patent
Lacy et al.

(10) Patent No.: US 10,099,290 B2
(45) Date of Patent: Oct. 16, 2018

(54) HYBRID ADDITIVE MANUFACTURING METHODS USING HYBRID ADDITIVELY MANUFACTURED FEATURES FOR HYBRID COMPONENTS

(71) Applicant: General Electric Company, Schenectady, NY (US)

(72) Inventors: Benjamin Paul Lacy, Greer, SC (US); Srikanth Chandrudu Kottilingam, Simpsonville, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 14/574,557

(22) Filed: Dec. 18, 2014

(65) Prior Publication Data
US 2016/0175934 A1  Jun. 23, 2016

(51) Int. Cl.
*B22F 5/00* (2006.01)
*B23K 26/34* (2014.01)
(Continued)

(52) U.S. Cl.
CPC .............. *B22F 7/08* (2013.01); *B22F 3/1055* (2013.01); *B22F 3/24* (2013.01); *B22F 5/009* (2013.01); *B22F 5/04* (2013.01); *B22F 7/06* (2013.01); *B22F 7/062* (2013.01); *B23K 10/027* (2013.01); *B23K 26/0006* (2013.01);
(Continued)

(58) Field of Classification Search
None
See application file for complete search history.

(56) References Cited

U.S. PATENT DOCUMENTS 2,924,471 A   2/1960 Poltorak et al.
3,020,185 A   2/1962 Moffitt, Jr. et al.
(Continued)

FOREIGN PATENT DOCUMENTS

DE   10037965 A1   2/2002
DE   20023961 U1   12/2007
(Continued)

OTHER PUBLICATIONS

Guo et al., "Additive manufacturing: technology, applications and research needs", Frontiers in Mech. Eng., vol. 8, Issue 3, p. 215-243.*
(Continued)

*Primary Examiner* — Devang R Patel
(74) *Attorney, Agent, or Firm* — Ernest G. Cusick; Frank A. Landgraff

(57) ABSTRACT

A hybrid additive manufacturing method comprises building an additive structure on a pre-sintered preform base, wherein building the additive structure comprises iteratively fusing together a plurality of layers of additive material with at least a first layer of additive material joined to the pre-sintered preform base, and wherein the pre-sintered preform base comprises an initial shape. The hybrid additive manufacturing method further comprises modifying the initial shape of the pre-sintered preform base comprising the additive structure into a modified shape comprising the additive structure, and, joining the pre-sintered preform base in its modified shape to a component.

7 Claims, 4 Drawing Sheets

(51) Int. Cl.

| | | |
|---|---|---|
| *B33Y 10/00* | (2015.01) | |
| *C22C 19/07* | (2006.01) | |
| *B22F 7/08* | (2006.01) | |
| *B22F 3/105* | (2006.01) | |
| *B22F 3/24* | (2006.01) | |
| *B22F 5/04* | (2006.01) | |
| *B22F 7/06* | (2006.01) | |
| *B33Y 80/00* | (2015.01) | |
| *B23K 26/342* | (2014.01) | |
| *B23K 26/00* | (2014.01) | |
| *C22C 19/05* | (2006.01) | |
| *F01L 9/02* | (2006.01) | |
| *B23K 10/02* | (2006.01) | |
| *B23K 103/18* | (2006.01) | |
| *B23K 103/08* | (2006.01) | |
| *B23K 103/10* | (2006.01) | |
| *B23K 103/14* | (2006.01) | |
| *B23K 103/04* | (2006.01) | |

(52) U.S. Cl.
 CPC ............ *B23K 26/342* (2015.10); *B33Y 10/00* (2014.12); *B33Y 80/00* (2014.12); *C22C 19/057* (2013.01); *C22C 19/058* (2013.01); *C22C 19/07* (2013.01); *F01L 9/02* (2013.01); *B22F 2005/005* (2013.01); *B22F 2301/15* (2013.01); *B23K 2203/05* (2015.10); *B23K 2203/08* (2013.01); *B23K 2203/10* (2013.01); *B23K 2203/14* (2013.01); *B23K 2203/18* (2013.01); *B23K 2203/26* (2015.10); *Y02P 10/295* (2015.11)

(56) References Cited

U.S. PATENT DOCUMENTS

| | | |
|---|---|---|
| 3,476,842 A | 11/1969 | Renwick |
| 3,914,490 A | 10/1975 | Fusiek |
| 4,220,342 A | 9/1980 | Shah |
| 4,226,429 A | 10/1980 | Sato et al. |
| 4,318,668 A | 3/1982 | Chaplin et al. |
| 4,462,603 A | 7/1984 | Usher et al. |
| 4,540,183 A | 9/1985 | Schneider et al. |
| 4,665,978 A | 5/1987 | Luke |
| 4,902,198 A | 2/1990 | North |
| 4,990,544 A | 2/1991 | Asaumi et al. |
| 5,209,503 A | 5/1993 | Heibel et al. |
| 5,375,973 A | 12/1994 | Sloop et al. |
| 5,407,214 A | 4/1995 | Lew et al. |
| 5,509,669 A | 4/1996 | Wolfe et al. |
| 5,527,599 A | 6/1996 | Hall et al. |
| 5,649,806 A | 7/1997 | Scricca et al. |
| 5,657,998 A | 8/1997 | Dinc et al. |
| 5,705,541 A | 1/1998 | Awe et al. |
| 5,705,916 A | 1/1998 | Rudbeck et al. |
| 5,716,052 A | 2/1998 | Swensen et al. |
| 5,823,741 A | 10/1998 | Predmore et al. |
| 5,934,687 A | 8/1999 | Bagepalli et al. |
| 5,957,657 A | 9/1999 | Akita et al. |
| 6,155,778 A | 12/2000 | Lee et al. |
| 6,162,014 A | 12/2000 | Bagepalli et al. |
| 6,446,979 B1 | 9/2002 | Steinetz et al. |
| 6,453,726 B1 | 9/2002 | Gutierrez et al. |
| 6,454,526 B1 | 9/2002 | Cunha et al. |
| 6,637,752 B2 | 10/2003 | Aksit et al. |
| 6,648,333 B2 | 11/2003 | Aksit et al. |
| 6,655,913 B2 | 12/2003 | Vedantam et al. |
| 6,659,472 B2 | 12/2003 | Aksit et al. |
| 6,692,227 B2 | 2/2004 | Tomita et al. |
| 6,726,448 B2 | 4/2004 | McGrath et al. |
| 6,764,081 B2 | 7/2004 | Mohammed-Fakir et al. |
| 6,783,323 B2 | 8/2004 | Shiozaki et al. |
| 6,843,479 B2 | 1/2005 | Burdgick |
| 6,971,844 B2 | 12/2005 | Burdgick |
| 7,029,228 B2 | 4/2006 | Chan et al. |
| 7,033,138 B2 | 4/2006 | Tomita et al. |
| 7,040,857 B2 | 5/2006 | Chiu et al. |
| 7,076,957 B2 | 7/2006 | Ahmed et al. |
| 7,153,379 B2 | 12/2006 | Millard et al. |
| 7,168,914 B2 | 1/2007 | Shiozaki et al. |
| 7,252,902 B2 | 8/2007 | Bram et al. |
| 7,284,954 B2 | 10/2007 | Parker et al. |
| 7,367,567 B2 | 5/2008 | Farah et al. |
| 7,467,517 B2 | 12/2008 | Strain |
| 7,901,186 B2 | 3/2011 | Cornett et al. |
| 8,038,405 B2 | 10/2011 | Ward et al. |
| 8,052,155 B2 | 11/2011 | Amos et al. |
| 8,079,806 B2 | 12/2011 | Tholen et al. |
| 8,128,100 B2 | 3/2012 | Bogue et al. |
| 8,163,436 B2 | 4/2012 | Larsen et al. |
| 8,231,128 B2 | 7/2012 | Morgan et al. |
| 8,240,985 B2 | 8/2012 | Martin |
| 8,511,982 B2 | 8/2013 | Hart et al. |
| 2002/0037952 A1 | 3/2002 | Zerfass |
| 2005/0040605 A1 | 2/2005 | Zerfass |
| 2005/0203236 A1 | 9/2005 | Prowell et al. |
| 2005/0232772 A1 | 10/2005 | Race et al. |
| 2006/0054079 A1* | 3/2006 | Withey .................. C30B 29/02 117/108 |
| 2007/0041827 A1 | 2/2007 | Camus |
| 2008/0004709 A1 | 1/2008 | O'Neill et al. |
| 2009/0229271 A1 | 9/2009 | De Ruyck et al. |
| 2009/0285675 A1 | 11/2009 | Lewis et al. |
| 2011/0052367 A1 | 3/2011 | Martin et al. |
| 2012/0133102 A1 | 5/2012 | Samudrala et al. |
| 2012/0292862 A1 | 11/2012 | Moehrie et al. |
| 2012/0328419 A1 | 12/2012 | Riggi et al. |
| 2013/0136868 A1* | 5/2013 | Bruck ..................... B05D 3/06 427/554 |
| 2014/0295087 A1* | 10/2014 | Rickenbacher ....... B22F 3/1055 427/383.1 |
| 2015/0110612 A1* | 4/2015 | Brandl .................... F01D 9/065 415/178 |
| 2015/0118060 A1* | 4/2015 | Kumar .................... F01D 5/005 416/241 R |
| 2015/0132605 A1* | 5/2015 | Kumar .................. C04B 35/117 428/680 |
| 2015/0360292 A1* | 12/2015 | Kountanya ............... B22F 5/04 419/53 |
| 2016/0010469 A1* | 1/2016 | Guo ...................... B22F 3/1055 416/229 R |

FOREIGN PATENT DOCUMENTS

| | | |
|---|---|---|
| DE | 2013006299 A1 | 10/2014 |
| DE | 102013006299 A1 | 10/2014 |
| EP | 2116621 A2 | 11/2009 |
| JP | 2002372714 A | 12/2002 |
| JP | 2007254563 A | 10/2007 |

OTHER PUBLICATIONS

EP Search Report regarding Application No. 15198344.2 dated Jun. 6, 2016.

European Search Report and Opinion issued in connection with corresponding EP Application No. 15198344.2 dated Jun. 6, 2016.

* cited by examiner

US 10,099,290 B2

HYBRID ADDITIVE MANUFACTURING METHODS USING HYBRID ADDITIVELY MANUFACTURED FEATURES FOR HYBRID COMPONENTS

STATEMENT REGARDING FEDERALLY SPONSORED RESEARCH & DEVELOPMENT

This invention was partially made with government support under government contract No. DE-FC26-05NT42643 awarded by the Department of Energy. The government has certain rights to this invention.

BACKGROUND OF THE INVENTION

The subject matter disclosed herein relates to additive manufacturing and, more specifically, to hybrid additive manufacturing methods using hybrid additively manufactured features for hybrid components.

Additive manufacturing processes generally involve the buildup of one or more materials to make a net or near net shape object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model. One exemplary additive manufacturing process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics may be used. Laser sintering or melting is one exemplary additive manufacturing process for rapid fabrication of functional prototypes and tools. Applications can include patterns for investment casting, metal molds for injection molding and die casting, molds and cores for sand casting, and relatively complex components themselves. Fabrication of prototype objects to facilitate communication and testing of concepts during the design cycle are other potential uses of additive manufacturing processes. Likewise, components comprising more complex designs, such as those with internal passages that are less susceptible to other manufacturing techniques including casting or forging, may be fabricated using additive manufacturing methods.

Laser sintering can refer to producing three-dimensional (3D) objects by using a laser beam to sinter or melt a fine powder. Specifically, sintering can entail fusing (agglomerating) particles of a powder at a temperature below the melting point of the powder material, whereas melting can entail fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate, and the effects of processing parameters on the microstructural evolution during the layer manufacturing process can lead to a variety of production considerations. For example, this method of fabrication may be accompanied by multiple modes of heat, mass and momentum transfer, and chemical reactions.

Laser sintering/melting techniques can specifically entail projecting a laser beam onto a controlled amount of powder material (e.g., a powder metal material) on a substrate (e.g., build plate) so as to form a layer of fused particles or molten material thereon. By moving the laser beam relative to the substrate along a predetermined path, often referred to as a scan pattern, the layer can be defined in two dimensions on the substrate (e.g., the "x" and "y" directions), the height or thickness of the layer (e.g., the "z" direction) being determined in part by the laser beam and powder material parameters. Scan patterns can comprise parallel scan lines, also referred to as scan vectors or hatch lines, and the distance between two adjacent scan lines may be referred to as hatch spacing, which may be less than the diameter of the laser beam so as to achieve sufficient overlap to ensure complete sintering or melting of the powder material. Repeating the movement of the laser along all or part of a scan pattern may facilitate further layers of material to be deposited and then sintered or melted, thereby fabricating a three-dimensional object.

For example, laser sintering and melting techniques can include using continuous wave (CW) lasers, such as Nd:YAG lasers operating at or about 1064 nm. Such embodiments may facilitate relatively high material deposition rates particularly suited for repair applications or where a subsequent machining operation is acceptable in order to achieve a finished object. Other laser sintering and melting techniques may alternatively or additionally be utilized such as, for example, pulsed lasers, different types of lasers, different power/wavelength parameters, different powder materials or various scan patterns to facilitate the production of one or more three-dimensional objects. However, the base shape of the three-dimensional object may be limited to relatively planar (e.g., flat) structures. Such shapes may not match up with non-planar (e.g., curved) components that the three-dimensional object may eventually be joined to.

Accordingly, alternative hybrid additive manufacturing methods using hybrid additively manufactured features for hybrid components would be welcome in the art.

BRIEF DESCRIPTION OF THE INVENTION

In one embodiment, a hybrid additive manufacturing method is disclosed. The hybrid additive manufacturing method comprises building an additive structure on a pre-sintered preform base, wherein building the additive structure comprises iteratively fusing together a plurality of layers of additive material with at least a first layer of additive material joined to the pre-sintered preform base, and wherein the pre-sintered preform base comprises an initial shape. The hybrid additive manufacturing method further comprises modifying the initial shape of the pre-sintered preform base comprising the additive structure into a modified shape comprising the additive structure, and, joining the pre-sintered preform base in its modified shape to a component.

In another embodiment, a hybrid additively manufactured feature is disclosed. The hybrid additively manufactured feature comprises a pre-sintered preform base comprising a modified shape different than an initial shape, and, an additive structure joined to the pre-sintered preform base, wherein the additive structure was built on the pre-sintered preform while in its initial shape by fusing together a plurality of layers of additive material with at least a first layer of additive material joined to the pre-sintered preform base while in its initial shape.

In yet another embodiment, a hybrid component is disclosed. The hybrid component comprises a pre-sintered preform base joined to a component. The pre-sintered preform base comprises a modified shape different than an initial shape. The hybrid component further comprises an additive structure joined to the pre-sintered preform base, wherein the additive structure was built on the pre-sintered preform base while in its initial shape by fusing together a plurality of layers of additive material with at least a first layer of additive material joined to the pre-sintered preform base while in its initial shape.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
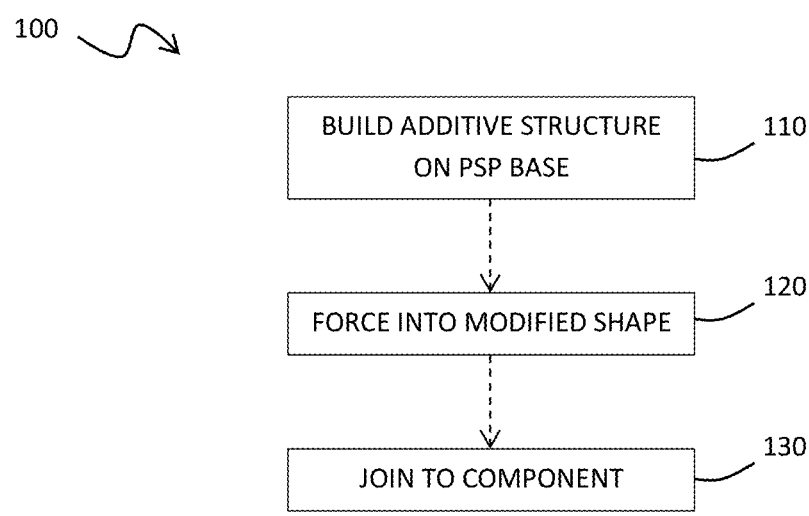
FIG. 1 illustrates a hybrid additive manufacturing method according to one or more embodiments shown or described herein.

Referring now to FIG. 1, a hybrid additive manufacturing method 100 is illustrated. Referring additionally to FIGS. 2-6, the hybrid additive manufacturing method 100 can generally comprise making a hybrid additively manufactured feature 5 comprising an additive structure 20 built on a pre-sintered preform base 10, which in turn can be modified into a modified shape 12. The hybrid additively manufactured feature 5 with its modified shape 12 can subsequently be joined to a component 30 (e.g., turbine component) to form a hybrid component 1. By modifying the pre-sintered preform base 10 into a modified shape 12 (e.g., curved shape) with the additive structure 20 built thereon, the hybrid additively manufactured feature 5 can be joined to a curved or otherwise non-planar surface 31 of a component 30. The hybrid additive manufacturing method 100 can thereby facilitate the joining of additively manufactured structures 20 (e.g., cooling features) to curved or complex components 30 (e.g., turbine components).

Specifically, the hybrid additive manufacturing method 100 can first comprise building an additive structure 20 on a pre-sintered preform base 10 in step 110, wherein building the additive structure 20 comprises iteratively fusing together a plurality of layers of additive material with at least a first layer of additive material joined to the pre-sintered preform base 10, and wherein the pre-sintered preform base 10 comprises an initial shape 11.

The pre-sintered preform base 10 can generally comprise a mixture of particles comprising a base alloy and a second alloy that have been sintered together at a temperature below their melting points to form an agglomerate and somewhat porous mass. Suitable particle size ranges for the powder particles include 150 mesh, or even 325 mesh or smaller to promote rapid sintering of the particles and minimize porosity in the pre-sintered preform 120 to about 10 volume percent or less. In some embodiments, the density of the pre-sintered preform 120 has a density of 90% or better. In even some embodiments, the pre-sintered preform 120 has a density of 95% or better.

The base alloy of the pre-sintered preform base 10 can comprise any composition such as one similar to the substrate (e.g., the turbine bucket shroud 108) to promote common physical properties between the pre-sintered preform 120 and the substrate. For example, in some embodiments, the base alloy (of the pre-sintered preform 120) and the substrate (e.g., the turbine bucket shroud 108) share a common composition (i.e., they are the same type of material). Depending, for example, on the desired application and/or build shape, in some embodiments, the base alloy can comprise nickel-based superalloys such as MAR-M-247, René N4, René N5, René 108, GTD-111®, GTD-222®, GTD-444®, and IN-738 or cobalt-based superalloys such as MAR-M-509 or FSX-414 as discussed above. In some embodiments, the properties for the base alloy include chemical and metallurgical compatibility with the substrate (e.g., the turbine bucket shroud 108), such as high fatigue strength, low tendency for cracking, oxidation resistance and/or machinability.

In some embodiments, the base alloy may comprise a melting point of within about 25° C. of the melting temperature of the component 30 and/or the additive structure 20 it will be joined to. In some embodiments, the base alloy may comprise a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance being nickel and incidental impurities. In even some embodiments, the base alloy may comprise a compositional range of, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities.

In even some embodiments, the base alloy may comprise MAR-M-247. Such a base alloy may comprise a compositional range of, by weight, about 59% nickel, about 10% tungsten, about 8.25% chromium, about 5.5% aluminum, about 3% tantalum, about 1% titanium, about 0.7% molybdenum, about 0.5% iron and about 0.015 percent boron. In some embodiments, the base alloy may comprise MAR-M-509. Such a base alloy may comprise a compositional range of, by weight, about 59% cobalt, about 23.5% chromium, about 10% nickel, about 7% tungsten, about 3.5% tantalum, about 0.6% carbon, about 0.5% zirconium and about 0.2% titanium.

It should be appreciated that while specific materials and compositions have been listed herein for the composition of the base alloy of the pre-sintered preform base 10, these listed materials and compositions are exemplary only and non-limiting and other alloys may alternatively or additionally be used. Furthermore, it should be appreciated that the particular composition of the base alloy for the pre-sintered preform base 10 may depend on the composition of the component 10 (e.g., a turbine nozzle) and/or the additive material used in the additive structure 20.

As discussed above, the pre-sintered preform base 10 further comprises a second alloy. The second alloy may also have a composition similar to the substrate (e.g., the turbine bucket shroud 108) but further contain a melting point depressant to promote sintering of the base alloy and the second alloy particles and enable bonding of the pre-sintered preform base 10 to the component 30 at temperatures below the melting point of the component. For example, in some embodiments the melting point depressant can comprise boron and/or silicon.

In some embodiments, the second alloy may comprise a melting point of about 25° C. to about 50° C. below the grain growth or incipient melting temperature of the component 30. Such embodiments may better preserve the desired microstructure of the component 30 during the heating process. In some embodiments, the second alloy may comprise a compositional range of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. For example, in some embodiments the second alloy may comprise commercially available Amdry DF4B nickel brazing alloy.

In even some embodiments, the second alloy may comprise MAR M-509B commercially available from WESGO Ceramics. Such a second alloy may comprise a compositional range of, by weight, about 22.9 to 24.75% chromium, 9.0 to 11.0% nickel, 6.5 to 7.6% tungsten, 3.0 to 4.0 percent tantalum, 2.6 to 3.16% boron, 0.55 to 0.65% carbon, 0.3 to about 0.6% zirconium, 0.15 to 0.3% titanium, up to 1.3% iron, up to 0.4% silicon, up to 0.1% manganese, up to 0.02% sulfur and the balance cobalt.

It should also be appreciated that while specific materials and compositions have been listed herein for the composition of the second alloy of the pre-sintered preform base 10, these listed materials and compositions are exemplary only and non-limiting and other alloys may alternatively or additionally be used. Furthermore, it should be appreciated that the particular composition of the second alloy for the pre-sintered preform base 10 may depend on the composition of the component 30 and/or the additive material of the additive structure 20.

The pre-sintered preform base 10 can comprise any relative amounts of the base alloy and the second alloy that are sufficient to provide enough melting point depressant to ensure wetting and bonding (e.g., diffusion/brazing bonding) of the particles of the base alloy and the second alloy to each other and to the surface 31 of the component 30. For example, in some embodiments the second alloy can comprise at least about 10 weight percent of the pre-sintered preform base 10. In some embodiments the second alloy can comprise no more than 70 weight percent of the pre-sintered preform base 10.

In even some embodiments, the base alloy may comprise commercially available MAR-M-247 and the second alloy may comprise commercially available DF4B. In some embodiments, the base alloy may comprise commercially available MAR-M-247 and the second alloy may comprise commercially available AMS4782. In some embodiments, the base alloy may comprise commercially available MAR-M-509 and the second alloy may comprise MAR-M-509B. In such embodiments, the ratio of base alloy to the second alloy may comprise from about 80%-85% base alloy to about 20%-15% second alloy. Alternatively, ratios of from about 90%-60% base alloy to about 10%-40% second alloy may be used.

Such embodiments may provide a sufficient amount of melting point depressant while limiting potential reduction of the mechanical and environmental properties of the subsequent heating. Furthermore, in these embodiments, the base alloy can comprise the remainder of the pre-sintered preform base 10 (e.g., between about 30 weight percent and about 70 weight percent of the pre-sintered preform). In even some embodiments, the particles of the base alloy can comprise about 40 weight percent to about 70 weight percent of the pre-sintered preform base 10 with the balance of the composition comprising particles of the second alloy. It should be appreciated that while specific relative ranges of the base alloy and the second alloy have been presented herein, these ranges are exemplary only and non-limiting and any other relative compositions may also be realized such that a sufficient amount of melting point depressant is provided as discussed above.

Figure 2:
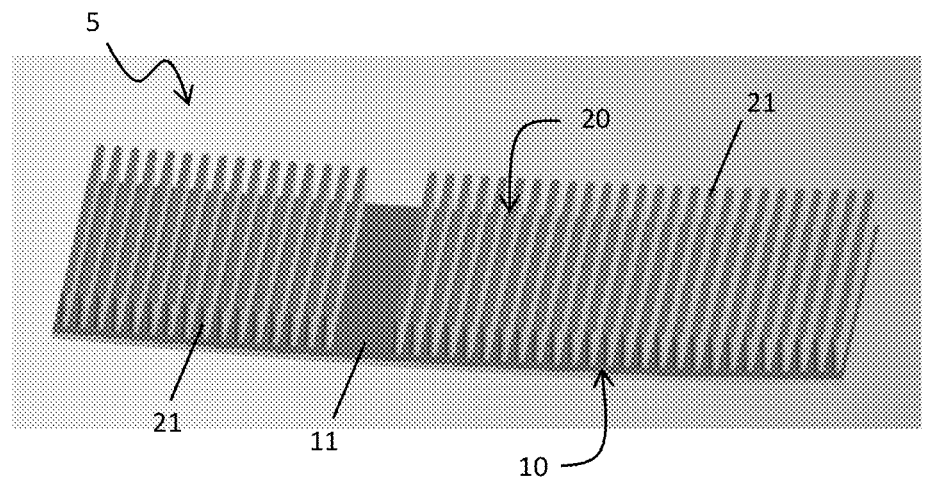
FIG. 2 is an additive structure on a pre-sintered preform base comprising an initial shape according to one or more embodiments shown or described herein.

The pre-sintered preform base 10 can comprise any initial shape 11 comprising any suitable geometry for the building of the additive structure 20 thereon using an additive manufacturing process as should be appreciated herein. For example, in some embodiments, the initial shape 11 can comprise a planar (i.e., flat) surface such as illustrated in FIG. 2.

As stated above, an additive structure 20 is built on the pre-sintered preform base in step 110. The additive structure 20 can be built by iteratively fusing together a plurality of layers of additive material, wherein at least a first layer of the material is joined to the pre-sintered preform base 10, in a process also referred to as additive manufacturing.

As used herein, "iteratively fusing together a plurality of layers of additive material" and "additive manufacturing" refers to any process which results in a three-dimensional object and includes a step of sequentially forming the shape of the object one layer at a time. Additive manufacturing processes include, but are not limited to, powder bed additive manufacturing and powder fed additive manufacturing processes such as by using lasers or electron beams for iteratively fusing together the powder material. Additive manufacturing processes can include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to fuse (e.g., sinter or melt) a powder material (e.g., using a powder bed process). Additive manufacturing processes can employ powder materials or wire as a raw material. Moreover additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially fused (e.g., sintered or melted) to solidify the layer.

The additive structure 20 built on the pre-sintered preform base 10 can comprise a variety of different additive materials. For example, the additive material can comprise any material that may be fused (e.g., sintered) by a laser beam or other energy source. In some embodiments, the additive material can comprise a powder metal. Such powder metals can include, by non-limiting example, cobalt-chrome alloys, aluminum and its alloys, titanium and its alloys, nickel and its alloys, stainless steels, tantalum, niobium or combinations thereof. In other embodiments, the additive material may comprise a powder ceramic or a powder plastic. In some embodiments, the additive material may be selected based at least in part on the component 30 and/or the pre-sintered preform base 10 such as by matching or substantially matching all or some of those materials.

The additive structure 20 built on the pre-sintered preform base 10 in step 110 can comprise a variety of shapes and configurations. For example, in some embodiments, the additive structure 20 can comprise a plurality of pins, plates, or the like. Such embodiments may provide for cooling features such as for turbine components by drawing heat away from the external surface. In some embodiments, the additive structure may comprise other cooling features such as one or more parts of fluid flow passages. In some embodiments, the additive structure 20 may comprise an part of a larger structure that can be combined with other adjacent additive structures 20 to form a larger feature. While specific embodiments of additive structures 20 have been discussed and illustrated herein, it should be appreciated that these are only intended to be non-limiting examples and additional or alternative embodiments may also be realized.

With continued reference to FIG. 1 and the exemplary embodiments in FIGS. 2-6, the hybrid additive manufacturing method 100 can further comprise modifying the initial shape in step 120 of the pre-sintered preform base 10 comprising the additive structure 20 (such as by applying a force 50) to modify it into a modified shape 12. In some embodiments, the pre-sintered preform base 10 may have its shape modified simply via gravity. In some embodiments, gravity may be used in combination with elevated temperatures to modify the shape in step 120. In some embodiments, any other additional or alternative force 50 may be applied through any suitable means such as, for example, via one or more vices, clamps, presses, plates or the like.

Figure 3:
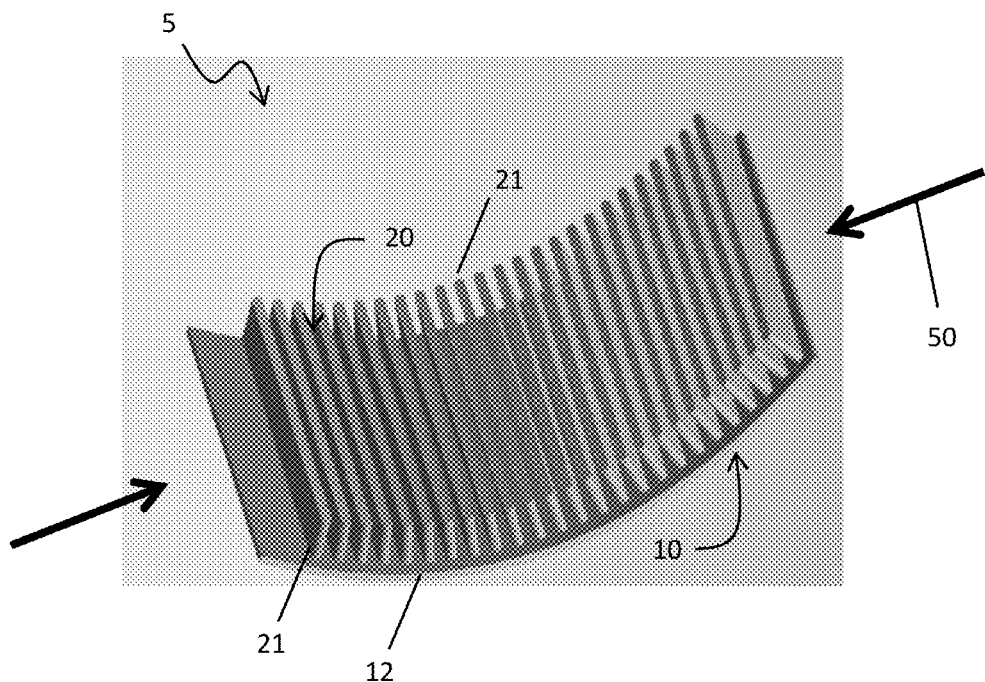
FIG. 3 is an additive structure on a pre-sintered preform base after modifying its shape according to one or more embodiments shown or described herein.
Figure 4:
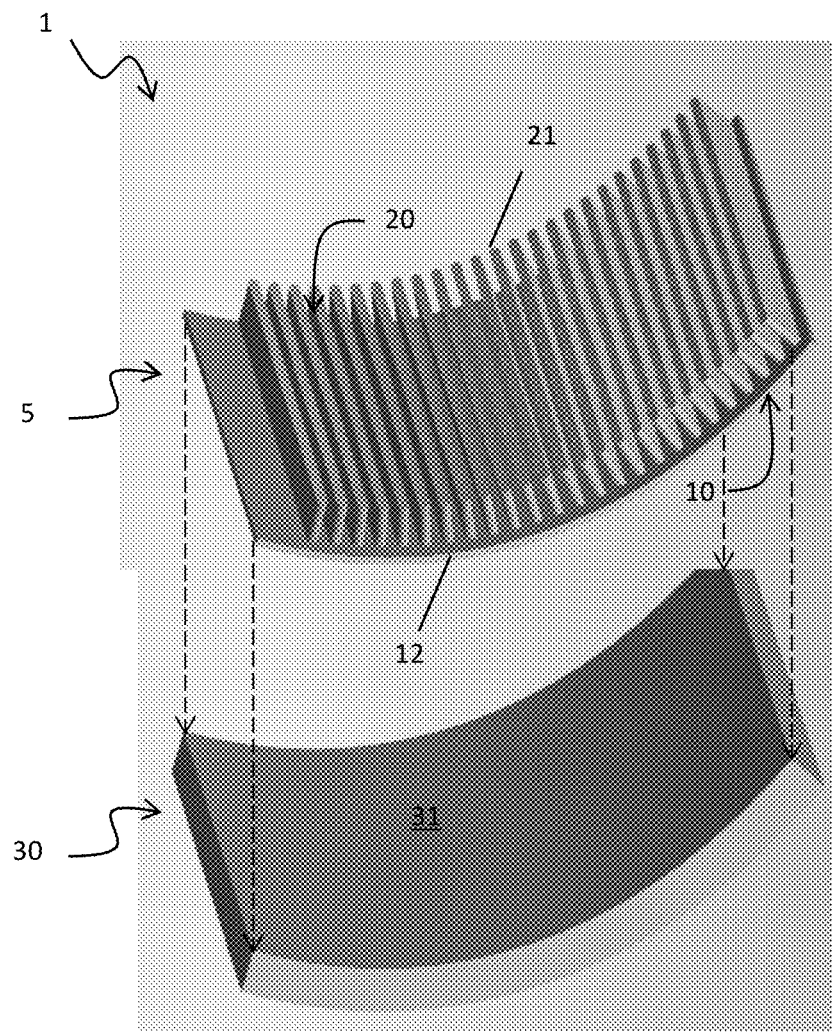
FIG. 4 is an exploded view of a hybrid additively manufactured feature being joined to a component according to one or more embodiments shown or described herein.

Moreover, modifying the initial shape in step 120 can comprise modifying the pre-sintered preform base 10 into any modified shape 12 that is different than the initial shape 11. In some embodiments, the modified shape 12 may comprise a non-planar surface. For example, the non-planar surface may comprise a curved shape such as illustrated in FIG. 3. In some embodiments, the modified shape 12 may comprise one or more bends, warps, oscillations or other non-planar deviations such as when compared to a substantially planar initial shape 11. The pre-sintered preform base 10 can be modified into any modified shape 12 that substantially matches the surface 31 of the component 30 so that it can be disposed against the surface 31 prior to joining. The resulting hybrid additively manufactured feature 5 comprising the pre-sintered preform base 10 with a modified shape 12 and the additive structure 20 may be more susceptible to joining with a component 30 with a non-planar surface than if the additive structure 20 simply comprised a flat surface and was to be joined directly.

The hybrid additive manufacturing method 100 can further comprise joining the pre-sintered preform base 10 in its modified shape 12 to a component 30 in step 130.

Figure 6:
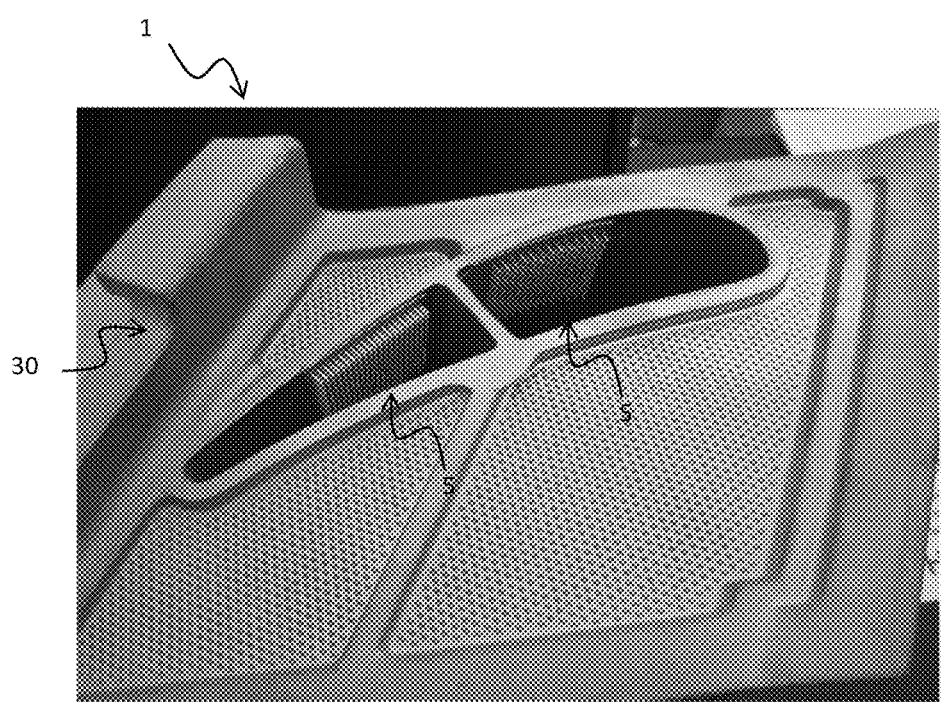

The component 30 can comprise any type of component that has a surface 31 for which the pre-sintered preform base 10 can be joined thereto, including when the surface 31 comprises a curved or otherwise non-planar shape. For example, in some embodiments, the component 30 may comprise a turbine component such as a nozzle as illustrated in FIG. 6. Such components 30 can comprise any metal or alloy substrate suitable for a braze application. Specifically, the present disclosure is generally applicable to any metal or alloy component 30 that may be brazed, particularly those components that operate within environments characterized by relatively high stresses and/or temperatures. Notable examples of such components 30 include turbine components such as turbine buckets (blades), nozzles (vanes), shrouds, and other hot gas path and combustion components of a turbine, such as an industrial gas or steam turbine or an aircraft gas turbine engine.

For example, in some embodiments, the component 30 may comprise a nickel-, cobalt, or iron-based superalloys. For example, the component 30 may comprise nickel-based superalloys such as René N4, René N5, René 108, GTD-111®, GTD-222®, GTD-444®, IN-738 and MarM 247 or cobalt-based superalloys such as FSX-414. The component 30 may be formed as an equiaxed, directionally solidified (DS), or single crystal (SX) casting to withstand relatively higher temperatures and stresses such as may be present within a gas or steam turbine.

The surface 31 of the component 30 for which the pre-sintered preform base 10 is to be joined to (as part of the larger hybrid additively manufactured feature 5), can comprise any surface 31 for which the additive structure 20 should be adjacent. The surface 31 can comprise any shaped surface such as a curved surface. Curved surfaces can include one or more curves, twists, oscillations or any other planar or non-planar surfaces, or combinations thereof. For example, the curved surface may comprise a surface of a three dimensionally shaped airfoil. In some particular embodiments, the surface 31 may comprise a mildly non-planar surface such that a single pre-sintered preform base 10 can be modified (e.g., forced) to a shape to match the surface 31.

In some specific embodiments, including where the additive structure 20 comprises one or more cooling feature extensions (i.e., pins, walls, or the like that extend away from pre-sintered preform base 10 and can draw away heat), the surface 31 of the component 30 to be joined with the pre-sintered preform base 10 may comprise an interior surface of a turbine component 30. In some such embodiments, the surface 31 may comprise an interior surface of a nozzle or other airfoil. While specific surfaces 31, locations of surfaces 31, shapes of surfaces 31, and components 30 comprising the surfaces 31 have been presented herein, it should be appreciated that these are intended to be non-limiting examples only; a plurality of other surfaces 31 and components 30 may additionally or alternatively be realized in the scope of this disclosure.

The heat applied in step 130 to join the pre-sintered preform base 10 to the surface 31 of the component 30 can comprise any suitable temperature, heat source, iterations, ramp rate, hold time, cycle and any other relevant parameters to join (e.g., braze, bond or the like) the materials together, such as by at least partially melting the second alloy pre-sintered preform base 10 such that it subsequently solidifies and joins the base alloy of the pre-sintered preform base 10 with the component 30.

For example, in some embodiments, to facilitate the joining process, a non-oxidizing atmosphere within the furnace and a method of inducing a pressure on pre-sintered preform base 10 and/or the component 30 may be provided. To obtain a non-oxidizing atmosphere, a vacuum may be formed in the furnace with a pressure of approximately 0.067 Pascal (Pa) (0.5 milliTorr) or less. The furnace may be heated to approximately 650° C. (1200° F.) at a rate of approximately 14° C./minute (25° F./minute). Once approximately 650° C. (1200° F.) is attained, this temperature may be maintained for approximately 30 minutes. Then the furnace temperature may be increased to approximately 980° C. (1800° F.) at a rate of approximately 14° C./minute (25° F./minute). Once approximately 980° C. (1800° F.) is attained, this temperature may be maintained for approximately 30 minutes. Then the furnace temperature may be increased to approximately 1204 to 1218° C. (2200 to 2225° F.) at a rate of approximately 19° C./minute (35° F./minute). Once approximately 1204 to 1218° C. (2200 to 2225° F.) is attained, this temperature may be maintained for approximately 20 minutes. In even some embodiments, a cooling cycle sub-step may include a controlled cooling of the brazing furnace with the pre-sintered preform 120 and the substrate (e.g., turbine bucket shroud 108) inside to approximately 1120° C. (2050° F.) and maintaining that temperature for approximately 60 minutes. Then the furnace may be further cooled to approximately 815° C. (1500° F.). The furnace may finally be subsequently cooled to approximately room temperature. While specific temperatures, times and ramp rates are disclosed herein, it should be appreciated that these are intended to be exemplary and non-limiting.

Figure 5:
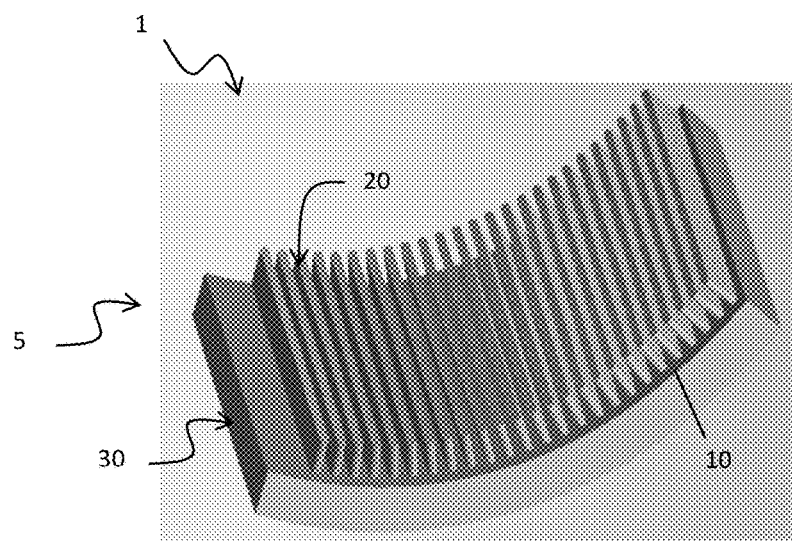
FIG. 5 is a schematic view of a hybrid component according to one or more embodiments shown or described herein; and, FIG. 6 is a perspective view of a hybrid component according to one or more embodiments shown or described herein.

As a result of joining the pre-sintered preform base 10 in its modified shape 12 to the surface 31 of the component 30, the hybrid additively manufactured feature 5 can be joined with the component 30 to form an overall hybrid component 1 as illustrated in FIGS. 5 and 6. The hybrid component 1 can comprise the additive structure 20 joined to a non-planar surface 31 of the component 30 where building said additive structure 20 directly on the surface may have been limited by access space or the like, or where if said additive structure 20 was joined to a flat plate, said plate could not have been joined to the curved component 30. For example, where other additive manufacturing methods may only have facilitated building features on a flat surface that could not conform and bond with non-flat surfaces, the herein disclosed hybrid additive manufacturing method builds features on ductile pre-sintered preform so that said pre-sintered preform may conform and bond with non-flat surfaces.

The hybrid component 1 may further comprise a variety of types of components such as one or more of the turbine components discussed herein. For example, the hybrid component 1 may comprise a turbine component wherein the additive structure 20 built on the pre-sintered preform base 20 (and subsequently joined to the component 30 itself) provides one or more cooling features such as through cooling pins, walls or the like. Such cooling features may help to draw heat away from the exterior surface of the component 30 to help maintain said component 30 in a specified operating temperature range. While specific components and features have been disclosed herein, it should be appreciated that these embodiments are intended to be non-limiting examples, and additional or alternative configurations may also be realized.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hybrid additive manufacturing method of producing a hybrid turbine component comprising:
    building an additive structure, wherein the additive structure comprises a plurality of cooling walls on a pre sintered preform base, wherein the plurality of cooling walls are spaced apart from each other with channels therebetween and wherein building the plurality of cooling walls comprises iteratively fusing together a plurality of layers of additive material with at least a first layer of additive material joined to the pre-sintered preform base, and wherein the pre-sintered preform base comprises an initial flat and planar shape;
    modifying the initial shape of the pre-sintered preform base comprising the plurality of cooling, walls into a modified shape such that the plurality of cooling walls form a non-planar shape;
    joining the pre-sintered preform base in its modified shape to a turbine component to produce the hybrid turbine component wherein the pre-sintered preform base comprises a mixture comprising a base ahoy and a second alloy, the base alloy and the turbine component share a common composition.

2. The hybrid additive manufacturing method of claim 1, wherein the modified shape comprises a non-planar surface.

3. The hybrid additive manufacturing method of claim 2, wherein the non-planar surface comprises a curved surface.

4. The hybrid additive manufacturing method of claim 1, wherein joining the pre-sintered preform base in its modified shape to the turbine component comprises joining the pre-sintered preform base to a curved surface of the turbine component.

5. The hybrid additive manufacturing method of claim 1, wherein the turbine component comprises a nozzle, and wherein joining the pre-sintered preform base in its modified shape to the nozzle comprises joining the pre-sintered preform base to an interior surface of the nozzle.

6. The hybrid additive manufacturing method of claim 1, wherein iteratively fusing together the plurality of layers of additive material comprises using a powder bed additive manufacturing process.

7. The hybrid additive manufacturing method of claim 1, wherein the mixture comprising the base alloy comprising 30 weight percent to 90 weight percent of the mixture and the second alloy comprising a sufficient amount of melting point depressant have a lower melting temperature than the base alloy.

* * * * *